United States Patent
Obayashi et al.

[11] Patent Number: 5,975,860
[45] Date of Patent: Nov. 2, 1999

[54] VIBRATION TORSION SYSTEM DAMPER FOR A SHAFT OF A COMPRESSOR

[75] Inventors: Masakazu Obayashi; Satoshi Koumura; Naofumi Kimura; Akira Nakamoto, all of Kariya, Japan

[73] Assignee: Kabushiki Kaisha Toyoda Jidoshokki Seisakusho, Aichi-ken, Japan

[21] Appl. No.: 08/864,304

[22] Filed: May 28, 1997

[30] Foreign Application Priority Data

May 31, 1996 [JP] Japan ................................ 8-138926

[51] Int. Cl.⁶ .................................................. F04B 49/00
[52] U.S. Cl. ............................................................ 417/223
[58] Field of Search ........................... 417/223, 319; 192/84 C; 112/210

[56] References Cited

U.S. PATENT DOCUMENTS

| | | | |
|---|---|---|---|
| 4,095,540 | 6/1978 | Kaltenbach et al. | 112/210 |
| 4,316,434 | 2/1982 | Bailey | 122/20 B |
| 4,467,753 | 8/1984 | Lange | 123/195 |
| 4,804,075 | 2/1989 | Koitabashi | 192/84 C |
| 5,195,479 | 3/1993 | Hasetoh et al. | 123/195 A |
| 5,219,273 | 6/1993 | Chang | 417/319 |
| 5,380,161 | 1/1995 | Takenaka et al. | 417/222.2 |
| 5,428,371 | 6/1995 | Fox et al. | 347/262 |
| 5,540,560 | 7/1996 | Kimura et al. | 417/223 |
| 5,601,168 | 2/1997 | Hayashi et al. | 192/55.6 |
| 5,644,970 | 7/1997 | Michiyuki et al. | 92/71 |
| 5,692,591 | 12/1997 | Kimura | 192/84.941 |

FOREIGN PATENT DOCUMENTS

| | | |
|---|---|---|
| 1 064 299 | 8/1959 | Germany . |
| 43 42 318 | 6/1994 | Germany . |
| 44 12 570 | 10/1994 | Germany . |
| 55-20908 | 7/1978 | Japan . |
| 55-20908 | 2/1980 | Japan . |
| 761139 | 8/1954 | United Kingdom . |

*Primary Examiner*—Charles G. Freay
*Assistant Examiner*—Robert Z. Evora
*Attorney, Agent, or Firm*—Woodcock Washburn Kurtz Mackiewicz & Norris LLP

[57] ABSTRACT

A compressor includes a drive shaft rotatably supported by a housing, a swash plate supported on the drive shaft, a plurality of cylinder bores defined in the housing, a plurality of pistons positioned in associated cylinder bores and a clutch. The clutch engaged and disengaged by a solenoid. A dynamic damper is positioned on the rear side of the drive shaft. The dynamic damper includes an elastic portion made of rubber and a mass portion made of metal. In another embodiment, the mass portion of the dynamic damper has a plurality of radially extending projections. In a further embodiment, the dynamic damper has a ring shape and is fixed to the armature of the clutch.

32 Claims, 10 Drawing Sheets

VIBRATION TORSION SYSTEM DAMPER FOR A SHAFT OF A COMPRESSOR

BACKGROUND OF THE INVENTION

1. Field of the Invention

The present invention relates to compressors employed in vehicle air conditioners, and more particularly, to compressors that produce little vibration and operate quietly.

2. Description of the Related Art

Figure 15:
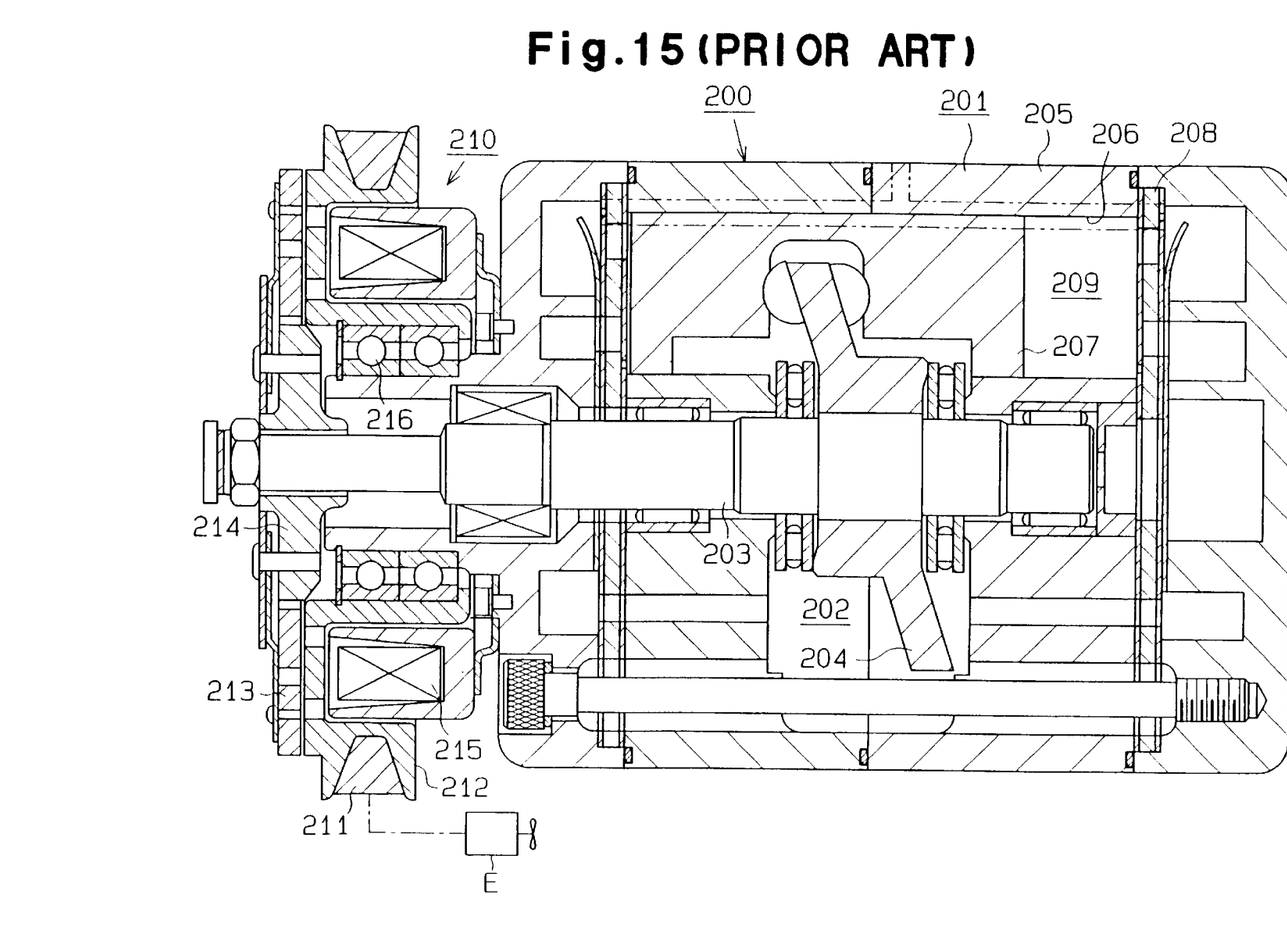
FIG. 15 a partial cross-sectional view showing a prior art compressor.

FIG. 15 shows a typical compressor 200 employed in a vehicle air conditioner. The compressor 200 is a swash plate type and is connected to an engine E by an electromagnetic clutch 210 attached to the front side of the compressor 200.

The compressor 200 includes a housing 201. A crank chamber 202 is defined in the housing 201. A drive shaft 203 is rotatably supported in the housing 201. A swash plate 204 is fixed to the drive shaft 203 and rotates integrally with the shaft 203. A plurality of cylinder bores 206 extend parallel to and about the drive shaft 203 in a cylinder block 205, which constitutes part of the housing 201. A piston 207 is located in each cylinder bore 206. The pistons 207 are connected to the swash plate 204. Valve plates 208 are provided on the front and rear ends of the cylinder block 205. A compression chamber 209 is defined in each cylinder bore 206 between an end of each piston 207 and one of the valve plates 208.

Rotation of the swash plate 204 is converted to linear reciprocation of each piston 207. This compresses refrigerant gas in each compression chamber 209.

The clutch 210 is connected to the front end of the compressor 200 with a bearing 216 in between. The clutch 210 includes an inner hub 214 secured to the front end of the drive shaft 203, an armature 213 secured to the inner hub 214, a pulley 212 and a solenoid 215 for attracting the armature 213 toward the pulley 212. The clutch 210 selectively connects and disconnects the compressor 200 with the engine E in accordance with the cooling load of an external refrigerant circuit (not shown). Exciting the solenoid 215 allows the armature 213 to be coupled to the pulley 212. This transmits the driving force of the engine E to the drive shaft 203 by way of the belt 211, the pulley 212, the armature 213 and the inner hub 214.

The compression stroke of each piston 107 produces a compression reactive force. The compression reactive force is transmitted to the drive shaft 203 through the swash plate 204 and creates torsion between the shaft 203 and the inner hub 214. This creates torsional vibration in the drive shaft 203. The torsional vibration represents torque fluctuation of the shaft 203 and fluctuation of rotational speed (rotational speed fluctuation) of the pulley 212. The torsional vibration also produces resonance in other auxiliary devices that are connected to the compressor 200 by the belt 211. This increases noise in the passenger compartment of the vehicle.

When the compressor reaches certain speeds, torsional vibration of the shaft 203 abruptly increases the torque of the drive shaft 203. The sudden increase in the torque causes the pulley 212 to slip on the armature 213. This suddenly disconnects the transmission of force from the engine E to the shaft 203. The contacting force between the armature 213 and the pulley 212 therefore needs to be great enough to prevent the slipping. This requires that the size of the solenoid 215 be enlarged.

Figure 14:
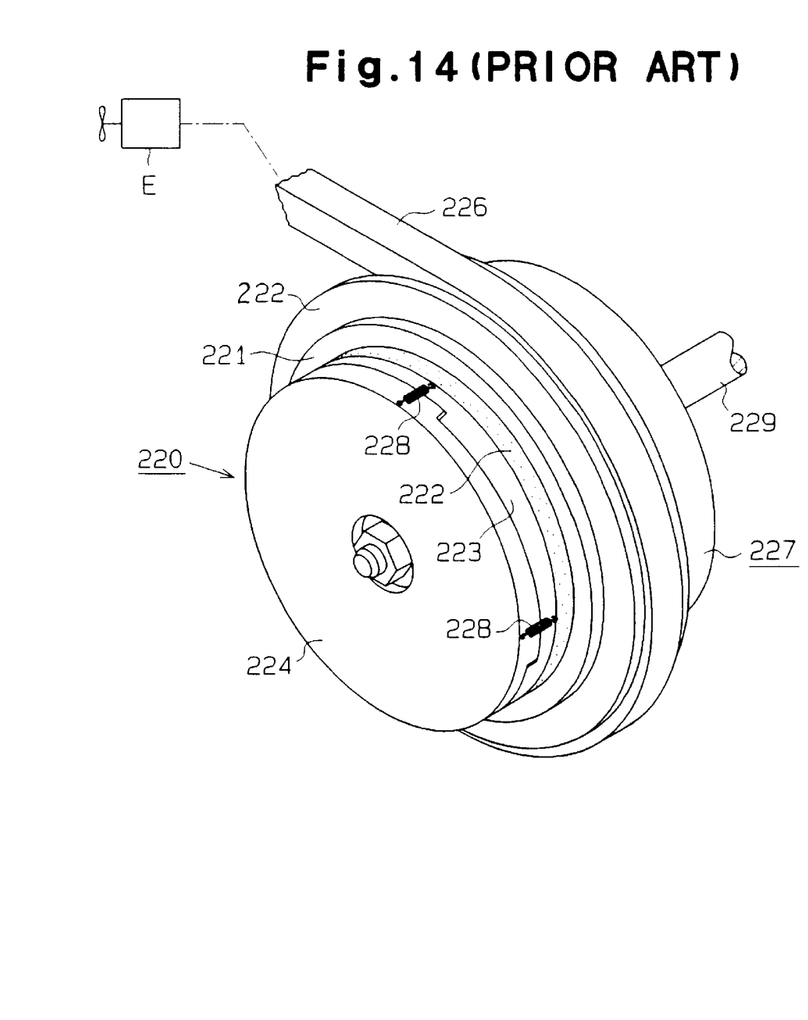
FIG. 14 is a perspective view showing a prior art clutch.

Japanese Unexamined Patent Publication No. 55-20908 describes an electromagnetic clutch that solves the above problems. As shown in FIG. 14, an electromagnetic clutch 220 includes a pulley 225, a solenoid (not shown), an armature 221, a damper 222, a connecting plate 223, a cover 224 secured to a drive shaft 229 and a plurality of springs 228. The armature 221 is secured to the connecting plate 223 with the damper 222 located in between. Exciting the solenoid couples the pulley 225 to the armature 221. The cover 224 is secured to an end of the drive shaft 229. The cover 224 and the connecting plate 223 contact and are urged toward each other by the force of the springs 228. The shape of the cover 224 and the plate 223 allows relative rotation to a certain extent. The relative rotation is converted to reciprocating motion of the connecting plate 223. The reciprocation of the plate 223 is then absorbed by the damper 222. When the armature 221 is coupled to the pulley 225, the force of the engine E is transmitted to the drive shaft 229 through the parts 225, 221, 222, 223 and 224. When an abrupt torsional vibration is generated on the drive shaft 229, the cover 224 and the connecting plate 223 rotate with respect to each other, thereby reciprocating the connecting plate 223. The reciprocation of the connecting plate 223 is absorbed by the damper 222. In this manner the torsional vibration is dampened by the damper 222.

The mechanism for reducing torsional vibration is provided in the path of the torque transmission from the pulley 225 to the drive shaft 229. This arrangement complicates the shape of the connecting plate 223 and the cover 224. Further, the springs 228 must be provided for coupling the plate 223 to the cover 224. The structure of the clutch 220 therefore complicates the manufacture of each part and increases the number of parts.

SUMMARY OF THE INVENTION

Accordingly, it is an objective of the present invention to provide a compressor that has a simple structure and operates quietly. Another objective of the present invention is to provide a compressor to which the driving force of an external drive source is securely transmitted without increasing the size of the solenoid in the clutch.

To achieve the above objective, the present invention provides a compressor. The compressor includes a housing, a plurality of compression chambers defined in the housing, a drive shaft rotatably supported by the housing, the drive shaft being driven by a power source, the drive shaft having a first end and a second end, a rotor integrally rotatable with the drive shaft, a clutch for selectively connecting and disconnecting the power source with the drive shaft, wherein the clutch is supported by the second end of the drive shaft, a transmission mechanism for transmitting power from the power source to the drive shaft, wherein the transmission mechanism includes a pulley rotatably supported on the drive shaft and a connecting means for connecting the power source to the pulley, a compression means for compressing gas supplied to the compression chambers based on the rotation of the rotor, and a dynamic damper for reducing the vibration of the drive shaft, the dynamic damper including an elastic member having a predetermined elasticity and a mass member having a predetermined mass, wherein said transmission mechanism and said rotor form a mass body, and wherein the elastic member is located between the mass body and the mass member.

Other aspects and advantages of the invention will become apparent from the following description, taken in conjunction with the accompanying drawings, illustrating by way of example the principals of the invention.

BRIEF DESCRIPTION OF THE DRAWINGS

The invention, together with objects and advantages thereof, may best be understood by reference to the following description of the presently preferred embodiments together with the accompanying drawings in which.

DETAILED DESCRIPTION OF THE PREFERRED EMBODIMENTS

A swash plate type compressor having double-headed pistons according to a first embodiment of the present invention will hereafter be described with reference to FIGS. 1–5.

Figure 1:
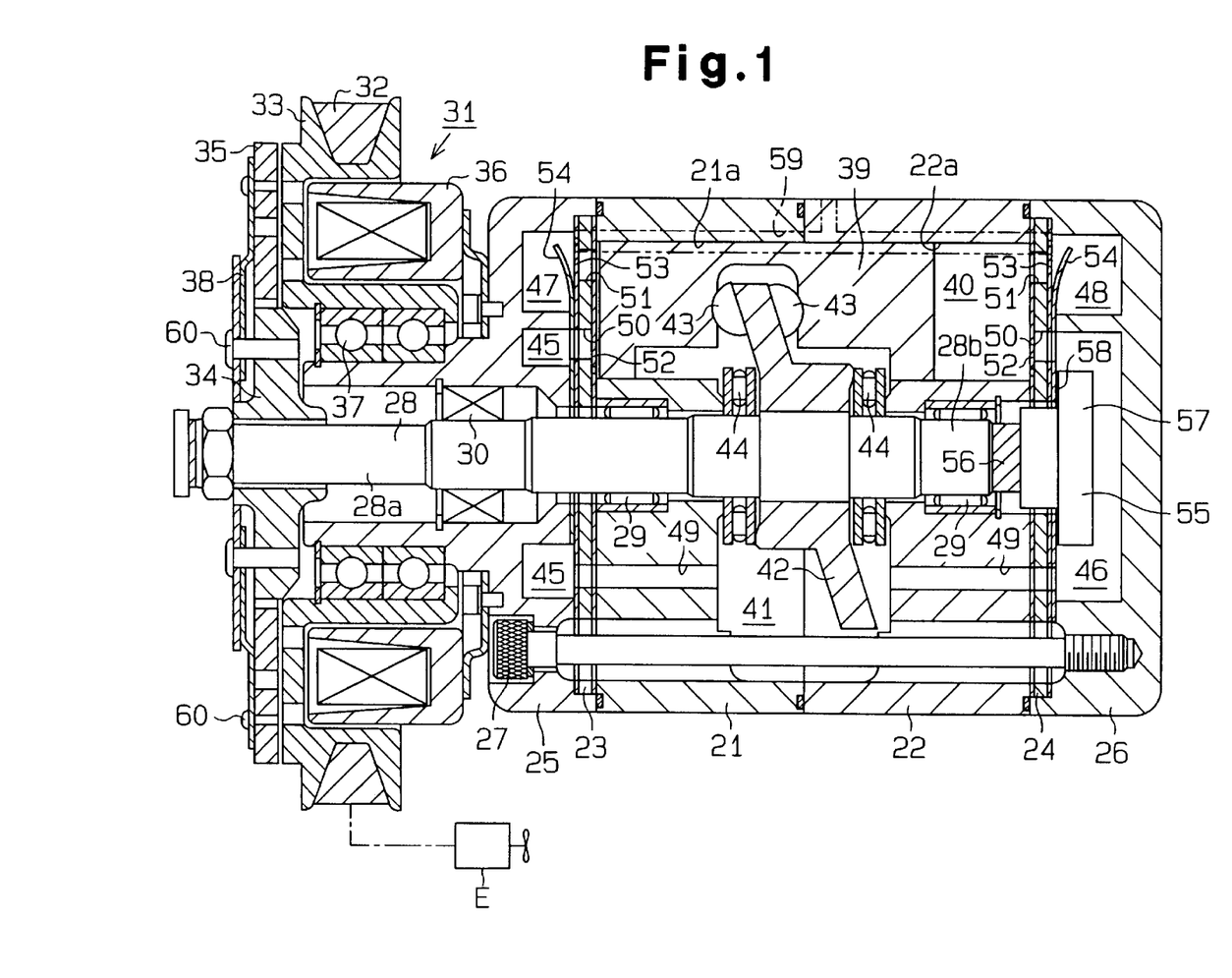
FIG. 1 is a partial cross-sectional view showing a compressor according to a first embodiment of the present invention.

As shown in FIG. 1, a front cylinder block 21 and a rear cylinder block 22 are coupled to each other. A front housing 25 is coupled to the front end of the front cylinder block 21 with a valve plate 23 arranged therebetween. A rear housing 26 is coupled to the rear end of the rear cylinder block 22 with a valve plate 24 arranged therebetween. The cylinder blocks 21, 22, the valve plates 23, 24, and the front and rear housings 25, 26, which constitute a compressor housing, are fastened to one another by a plurality of bolts 27.

A drive shaft 28 is rotatably supported by the cylinder blocks 21, 22 and the front housing 25 by way of a pair of radial bearings 29. The front end of the shaft 28 protrudes from the front housing 25. A lip seal 30 is located between the front housing 25 and the drive shaft 28. A clutch 31 is attached to the front side of the front housing 25. The clutch 31 selectively connects and disconnects the drive shaft 28 with the engine E, thereby selectively transmitting the driving force of the engine E to the drive shaft 28.

The clutch 31 includes a pulley 33, an inner hub 34, an armature 35 and a solenoid 36. The pulley 33 is rotatably supported about the front housing 25 with a bearing 37 in between. A belt 32 is hooked about the pulley 33. The inner hub 34 is fixed to the front end of the drive shaft 28. The armature 35 is fixed to the inner hub 34 by a leaf spring 38 and a plurality of pins 60. The rear face of the armature 35 is selectively coupled to and separated from the front end of the pulley 33. The solenoid 36 is fixed to the front housing 25 and faces the armature 35 with the pulley 33 located in between.

A plurality of pairs of axially aligned cylinder bores 21a, 22a extend parallel to and about the drive shaft 28 in the cylinder blocks 21, 22 with a predetermined interval between adjacent pairs of the bores 21a, 22a. A double-headed piston 39 is accommodated in each pair of cylinder bores 21a, 22a. Each piston 39 reciprocates in the associated pair of bores 21a, 22a. The pistons 39 and the valve plates 23, 24 define compression chambers 40 in the cylinder bores 21a, 22a.

A crank chamber 41 is defined between the cylinder blocks 21 and 22. A swash plate 42 is secured to the longitudinal middle portion of the drive shaft 28 and is located in the crank chamber 41. The swash plate 42 is connected to the middle of each piston 39 by a pair of semispheric shoes 43. The swash plate 42 rotates integrally with the shaft 28. When the drive shaft 28 rotates the swash plate 42, force is transmitted to each piston 39 which causes each piston 39 to reciprocate in the associated pair of cylinder bores 21a, 22a. A pair of thrust bearings 44 are arranged on the front and rear surfaces of the swash plate 42 and rotatably support the swash plate 42.

Suction chambers 45, 46 are defined in the front and rear housings 25 and 26, respectively. Discharge chambers 47, 48 are also defined in the front and rear housings 25 and 26, respectively. Suction passages 49 extend through the cylinder blocks 21, 22 and the valve plates 23, 24 to connect the suction chambers 45, 46 with the crank chamber 41. The crank chamber 41 is connected to an external refrigerant circuit (not shown). Discharge passages 59 extend through the cylinder blocks 21, 22 and the valve plates 23, 24 to connect the discharge chambers 47, 48 with the external refrigerant circuit.

A plurality of suction ports 50 are formed in the valve plates 23, 24 to communicate each compression chamber 40 with the suction chambers 45, 46. A plurality of discharge ports 51 are formed in the valve plates 23, 24 to communicate each compression chamber 40 with the discharge chambers 47, 48. A plurality of suction valves 52 are formed on the valve plates 23, 24 on the sides facing the compression chambers 40. Each valve 52 corresponds to one of the suction ports 50. A plurality of discharge valves 53 are formed on the valve plates 23, 24. The discharge valves 53 are located on the opposite side of each valve plate 23, 24 from the suction valves. Each valve 53 corresponds to one of the discharge ports 51. A retainer 54 is provided in the discharge chambers 47, 48 for defining the maximum opening of the discharge valves 53.

Figure 2:
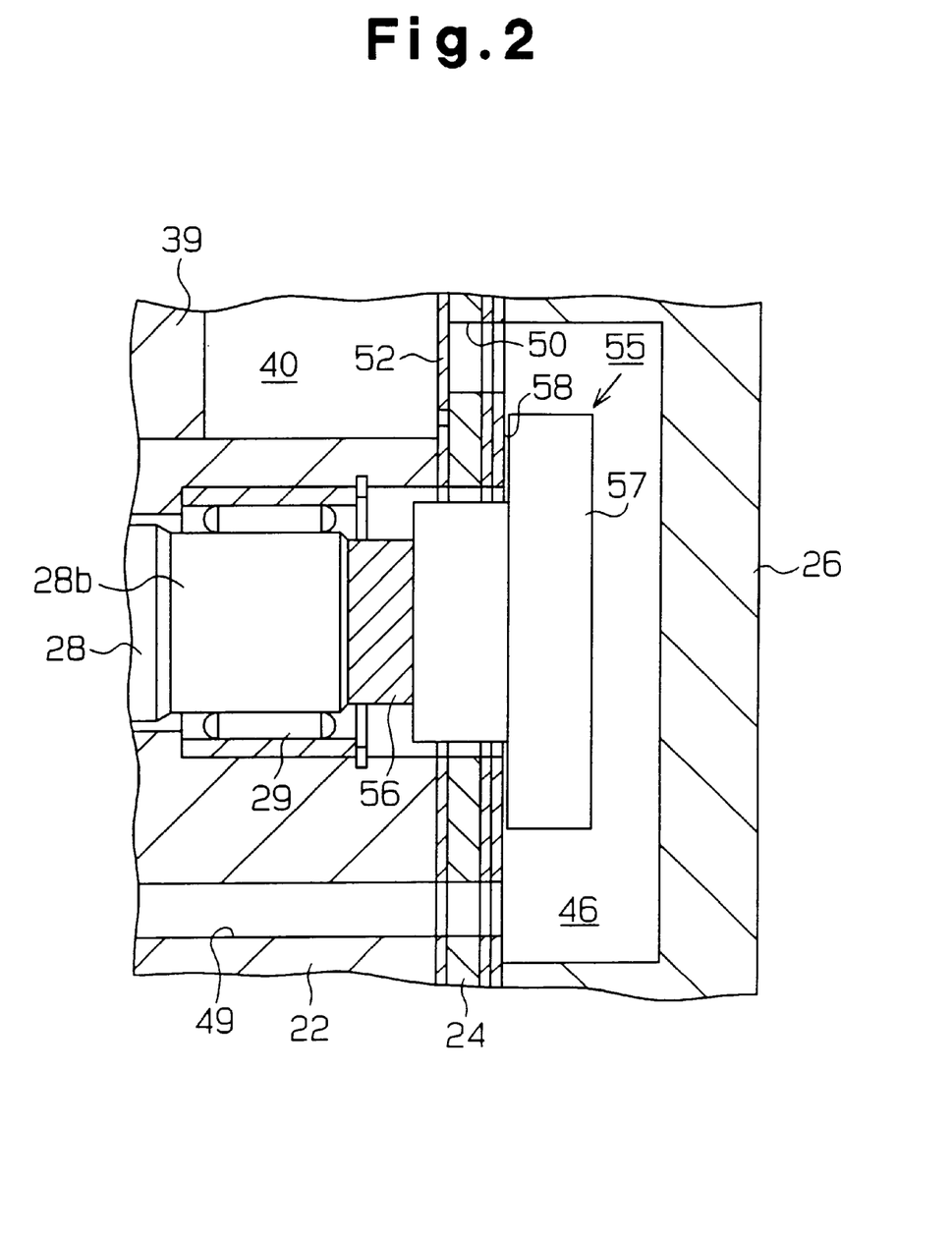
FIG. 2 is an enlarged partial cross-sectional view showing the dynamic damper of FIG. 1.

As shown in FIGS. 1 and 2, a dynamic damper 55 includes a rubber elastic portion 56 and a circular metal mass portion 57. The elastic portion 56 is fixed to the rear end of the drive shaft 28. The mass portion 57 is located in the suction chamber 46 defined in the rear housing 26, and is surrounded by refrigerant gas drawn into the chamber 46. A space 58, in which oil film is formed, is defined between the front face of the mass portion 57 and the valve plate 24. The width of the space 58 is exaggerated in FIG. 2. In reality, the width of the space 58 is made as narrow as possible.

Next, the connection of mass bodies and elastic bodies in a torsional vibration system in the above compressor will be described with reference to FIGS. 1 to 3.

Figure 3:
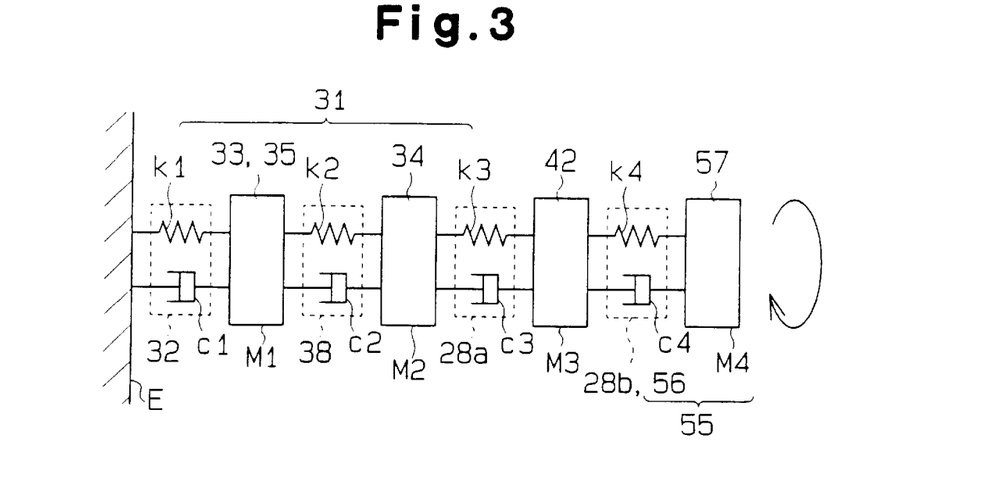
FIG. 3 is a diagram showing the connection of elastic bodies and mass bodies in the torque transmission path of the compressor of FIG. 1.

In FIG. 3, the fixed end on the left (as viewed in the drawing) represents the engine E as an external drive source. The belt 32 is represented by a spring k1 and a damper c1. Similarly, the leaf spring 38 is represented by a spring k2 and a damper c2, the front portion 28a of the drive shaft 28 is represented by a spring k3 and a damper c3, and the rear portion 28b of the drive shaft 28 and the elastic portion 56 are represented by a spring k4 and a damper c4. The pulley 33 and the armature 35 are represented by a mass M1. Similarly, the inner hub 34, the swash plate 42 and the mass portion 57 are represented by masses M2, M3 and M4, respectively. The pulley 33 and the armature 35, which function as the mass M1, are connected to the engine E by the belt 32, which functions as the spring k1 and the damper c1. The inner hub 34, which functions as the mass M2, is connected to the armature 35 by the leaf spring 38, which functions as the spring k2 and the damper c2. The swash plate 42, which functions as the mass M3, is connected to the inner hub 34 by the front portion 28a of the drive shaft 28, which functions as the spring k3 and the damper c3. The mass portion 57 of the dynamic damper 55, which functions as the mass M4, is connected to the swash plate 42 by the rear portion 28b of the drive shaft 28 and the elastic portion 56 of the dynamic damper 55.

The drive shaft 28 and the elastic portion 56 are located between the swash plate 42 and the mass portion 57. The elastic portion 56 can be deformed by a weaker force than the force required to deform the drive shaft 28. The modulus of elasticity (the spring constant) of the elastic portion 56 is smaller than that of the drive shaft 28. Therefore, deformation of the shaft 28 is negligible compared to that of the portion 56. Thus, it is assumed that only one elastic body (the elastic portion 56) is placed between the swash plate 42 and the mass portion 57.

The operation of the compressor will now be described with reference to FIG. 1.

The driving force of the engine E is transmitted to the pulley 33 by the belt 32. The pulley 33 is always rotated when the engine E is running. The solenoid 36 is excited when there is a cooling load in the external refrigerant circuit. Exciting the solenoid 36 couples the armature 35 to the pulley 33 against the force of the leaf spring 38. Accordingly, the drive shaft 28 is connected to the engine E. When there is no cooling load in the external refrigerant circuit, the solenoid 36 is de-excited. De-exciting the solenoid 36 allows the force of the leaf spring 38 to disconnect the armature 35 from the pulley 33. The drive shaft 28 is thus disconnected from the engine E.

When the clutch 31 connects the drive shaft 28 with the pulley 33, the drive shaft 28 is rotated by the force of the engine E. The swash plate 42 rotates integrally with the shaft 28 and causes the pistons 39 to reciprocate in the cylinder bores 21a, 22a. The reciprocation of the pistons 39 draws refrigerant gas into the crank chamber 41 from the external refrigerant circuit via an inlet port (not shown). The refrigerant gas is then drawn into the suction chambers 45, 46 via the suction passages 49. During the suction stroke, the suction valve 52 is opened by the pressure decrease in the compression chamber 40. This draws the refrigerant gas in the suction chambers 45, 46 into the compression chambers 40 through the suction ports 50.

During the compression and discharge stroke, the refrigerant gas in the compression chamber 40 is compressed to a certain level of pressure. Then, the pressurized gas opens the discharge valve 53 and is discharged to the discharge chambers 47, 48 through the discharge ports 51. The gas in the chambers 47, 48 is then discharged to the external refrigerant circuit, which includes a condenser, an expansion valve and an evaporator, via the discharge passages 59 and an outlet port (not shown). The gas is then utilized for cooling the passenger compartment of the vehicle.

Figure 4:
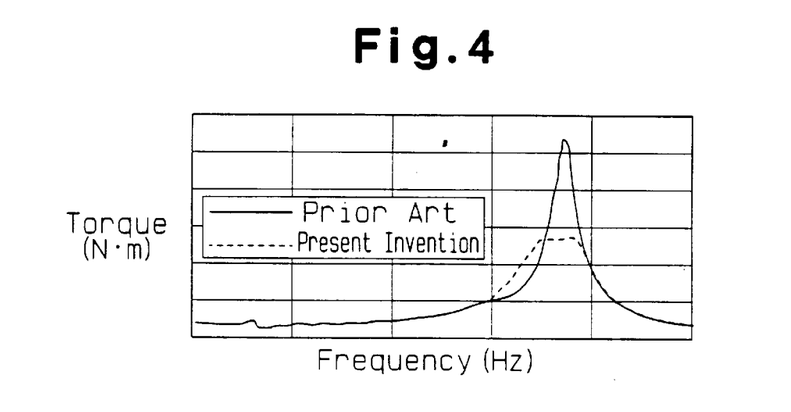
FIG. 4 is a graph showing the relationship between the torque of a drive shaft and the frequency of torsional vibration of the shaft.

During the compression stroke, the reciprocation of the piston 39 generates reactive force applied by the refrigerant gas. The reactive force is transmitted to the drive shaft 28 via the swash plate 42. The transmitted force twists the shaft 28 with respect to the inner hub 34 in the rotational direction. Accordingly, torsional vibration is generated in the shaft 28. This results in torque fluctuation of the drive shaft 28 and rotational speed fluctuation of the pulley 33. If the frequency of the torsional vibration is equal to the natural frequency of the dynamic damper 55, the mass portion 57 of the dynamic damper 55 resonates and greatly vibrates in the rotational direction. The vibration of the mass portion 57 consumes the kinetic energy of the drive shaft's torsional vibration. As shown in FIG. 4, the vibration of the mass portion 57 lowers the peak of torque fluctuation caused by torsional vibration of the drive shaft 28. Although not shown in the graph, the rotational speed fluctuation of the pulley 33 is also reduced in the same manner as the torque fluctuation of the drive shaft 28.

Rotation of the mass portion 57 introduces lubricant into the space 58 between the mass portion 57 and the valve plate 24. Accordingly, an oil film is formed in the space 58. Shear force produced by the vibration of the mass portion 57 acts on the oil film. The shear force functions as resistance against the rotation of the mass portion 57, thereby damping the vibration of the mass portion 57. Accordingly, the torsional vibration of the shaft 28 is damped. This reduces torque fluctuation of the drive shaft 28 and rotational speed fluctuation of the pulley 33.

Figure 5:
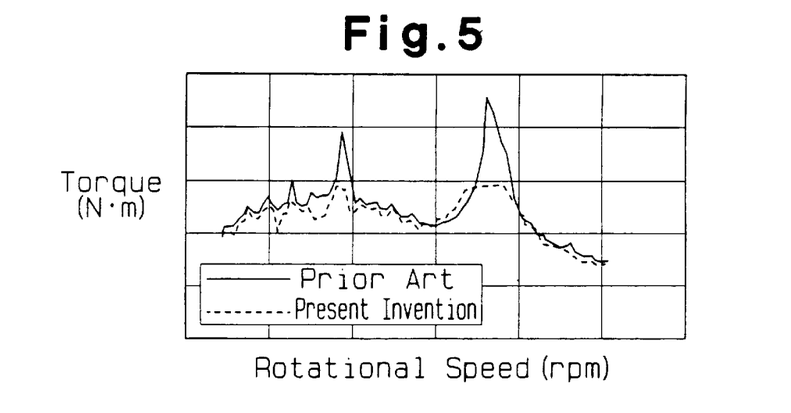
FIG. 5 is a graph showing the relationship between the torque and the rotational speed of a drive shaft.

As shown in FIG. 5, the torque of the drive shaft 28 does not abruptly increase at certain ranges of the rotational speed. Thus, slipping between the armature 35 and the pulley 33 is prevented without enlarging the size of the solenoid 36 in the clutch 31. The driving force of the engine E is therefore positively transmitted to the drive shaft 28.

As described above, the dynamic damper 55, which has a simple structure, lowers the torque peak of the drive shaft 28 caused by the torsional vibration of the drive shaft 28. Accordingly, the resonance between the drive shaft 28 and other auxiliary devices connected to the compressor by the belt 32 is significantly reduced. Noise in the passenger compartment is thus reduced.

The mass portion 57 of the dynamic damper 55 is located in refrigerant gas in the suction chamber 46, the temperature of which is relatively constant. Therefore, the elastic portion 56 of the damper 55 is not affected by temperature changes outside the compressor, for example, the heat from the engine E. The temperature of the elastic portion 56 is therefore maintained at a relatively constant level. Accordingly, the elastic modulus of the elastic body 56 remains constant. This maintains the resonance frequency of the damper 55 at a constant level. Therefore, the mass portion 57 is positively resonated by the torsional vibration of the drive shaft 28.

The dynamic damper 55 is fixed to the rear end of the drive shaft 28 and is accommodated in the compressor. This structure permits the compressor to be compact. Since the damper 55 is located in the suction chamber 46, the shape of the mass portion 57 may be altered arbitrarily without changing the shape of other parts in the compressor. Altering the shape of the portion 57 varies the resonance frequency of the damper 56. Accordingly, the resonance frequency of the damper 56 may readily be matched with the resonance frequency of the drive shafts of different compressors.

The mass portion 57 of the dynamic damper 55 has a substantially circular shape. Therefore, the weight of the mass portion 57 may be reduced by enlarging its diameter and making the portion 57 thinner without changing the resonance frequency of the portion 57. This reduces the weight of the dynamic damper 55. The weight of the compressor is reduced, accordingly.

The elastic portion 56 of the dynamic damper 55 is made of rubber. The portion 56 thus has a great damping effect to the vibration of the mass portion 57. Therefore, torque fluctuation of the shaft 28 and rotational speed fluctuation of the pulley 33 are effectively reduced.

Figure 6:
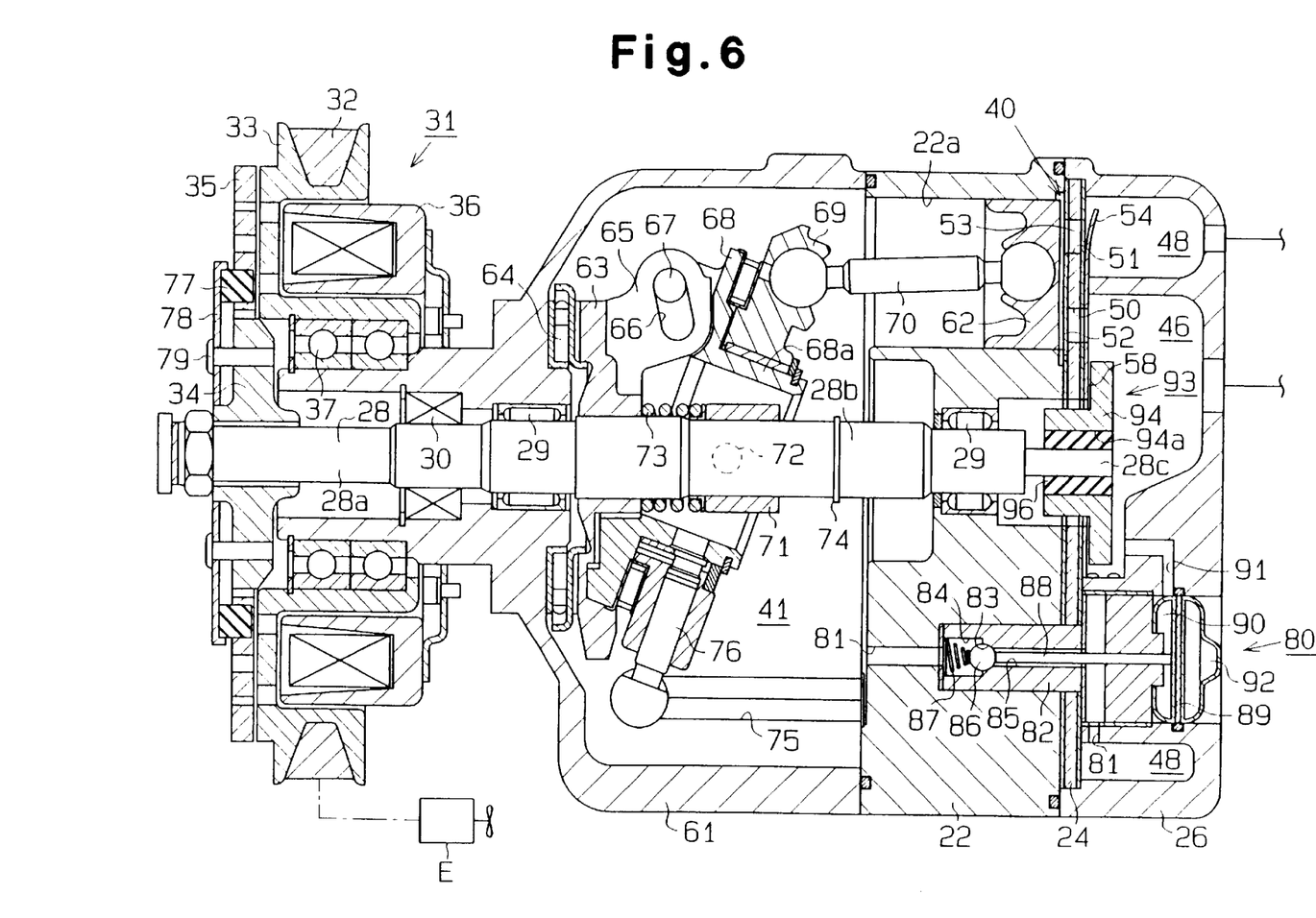
FIG. 6 is a partial cross-sectional view showing a compressor according to a second embodiment of the present invention, in which the wobble plate is at the maximum inclination.

A second embodiment according to the present invention will now be described with reference to FIGS. 6 to 8. As shown in FIG. 6, the compressor is a variable displacement type having a wobble plate and single-headed pistons. The differences from the first embodiment will mainly be discussed below.

Figure 7:
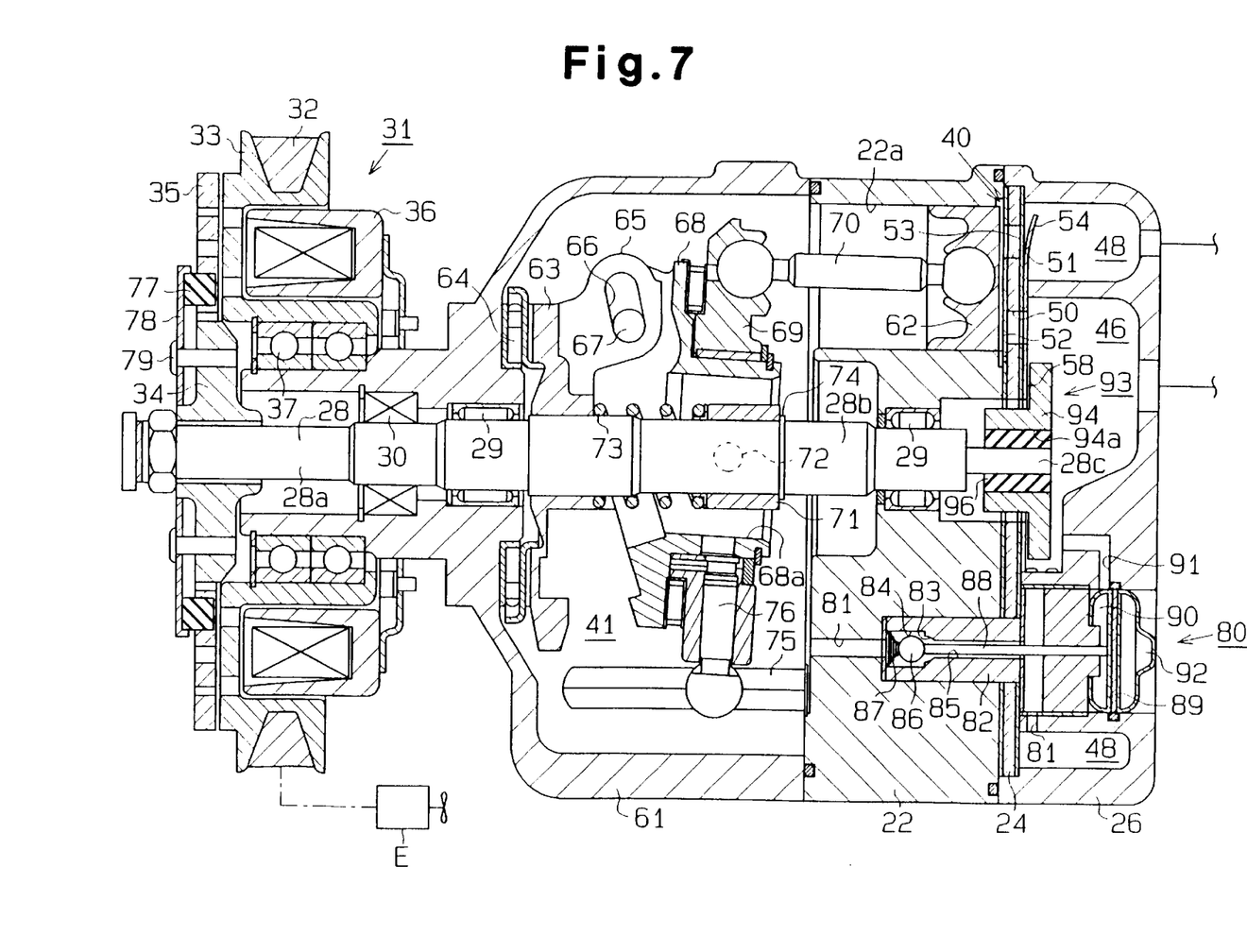
FIG. 7 is a partial cross-sectional view showing the compressor of FIG. 6, in which the wobble plate is at the minimum inclination.
Figure 8:
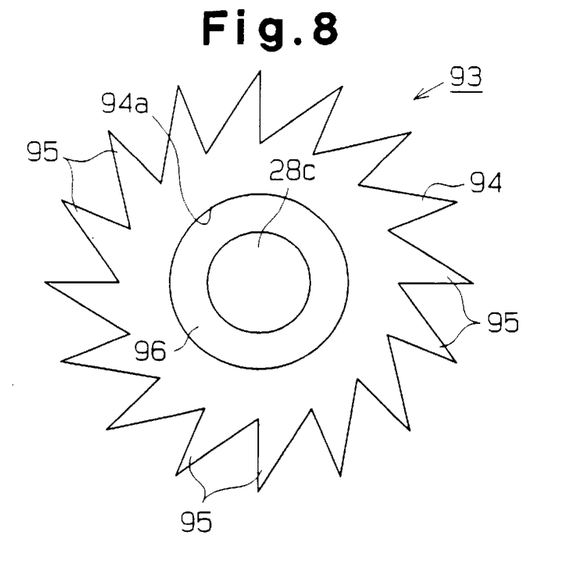
FIG. 8 is a plan view showing a mass body of the dynamic damper provided in the compressor of FIG. 6.

As shown in FIGS. 6 and 7, the compressor includes a cylinder block 22 and a front housing 61 that is secured to the front face of the cylinder block 22. A crank chamber 41 is defined by the cylinder block 22 and the front housing 61. The cylinder block 22 constitutes a compressor housing. A plurality of cylinder bores 22a are defined in the cylinder block 22. A single-headed piston 62 is housed in each cylinder bore 22a. Each piston 62 reciprocates in the associated cylinder bore 22a.

A drive shaft 28 is rotatably supported by the cylinder block 22 and the front housing 61 with a pair of radial bearings 29 located in between. A rotor 63 is fixed to the drive shaft 28. A thrust bearing 64 is arranged between the rotor 63 and the front housing 61. A support arm 65 having an elongated hole 66 is formed at the outer peripheral section of the rotor 63 and protrudes rearward. A cylindrically shaped slider bushing 71 is mounted on the drive shaft 28 and is reciprocally movable in a front and rear axial direction. A rotary journal 68 is loosely mounted on the drive shaft 28. A boss section 68a of the journal 68 is jointed with the slider bushing 71 by a pair of coupling pins 72. The journal 68 is also jointed with the rotor 63. Specifically, a coupling pin 67 is secured at the outer peripheral portion of the rotary journal 68 so as to correspond to the support arm section 65 and is fitted into the elongated hole 66.

A wobble plate 69 is provided on the boss section 68a of the rotary journal 68. Each piston 62 is coupled to the wobble plate 69 by a piston rod 70. A spring 73 is located between the rotor 63 and the slider bushing 71. The spring 73 urges the slider bushing 71 in a manner minimizing the inclination of the wobble plate 69. A stopper 74 is fixed to the drive shaft 28 for limiting the sliding motion of the slider 71. The stopper 74 defines the minimum inclination of the wobble plate 69. An anti-rotational pin 76 is fitted to the wobble plate 69. A guide groove 75 is formed in the front housing 61. The pin 76 is engaged with the groove 75 and slides in a back-and-forth direction along the groove 75. The engagement of the pin 76 and the groove 75 prevents the rotation of the wobble plate 69, while allowing the wobble plate 69 to swing back and forth.

A rubber damper 77 is secured to the armature 35 by a plate 78 and a plurality of pins 79.

A passage 81 is formed in the rear housing 26 and the cylinder block 22 for communicating the discharge chamber 48 with the crank chamber 41. A control valve 80 is housed in the rear housing 26 and the cylinder block 22 and is located in the passage 81. The control valve 80 selectively opens and closes the passage 81. The control valve 80 includes a casing 82. A valve seat 83 and a valve chamber 84 are defined in the casing 82. The valve body 86 is accommodated in the valve chamber 84 for opening and closing a through hole 85, which is connected to the passage 81. The valve body 86 is urged by a spring 87 toward the valve seat 83. A rod 88 is retained in the through hole 85 and contacts the valve body 86. The rod 88 pushes the valve body 86 for opening the through hole 85. The rear end of the rod 88 contacts a diaphragm 89 provided on its rear end of the casing 82. A pressure sensing chamber 90 is defined next to the front side of the diaphragm 89, while a constant pressure chamber 92 is defined next to the rear side of the diaphragm 89. The pressure sensing chamber 90 is communicated with the suction chamber 46 by a passage 91.

The drive shaft 28 has a small diameter portion 28c at the rear end. A dynamic damper 93 is located about the small diameter portion 28c. A mass portion 94 of the damper 93 has a plurality of saw-blade-like protrusions 95 (see FIG. 8). The shape of the protrusions 95 may be changed. Preferably, the protrusions 95 have a shape that increases resistance against the rotation of the mass portion 94. A cylindrical rubber elastic portion 96 is located between the small diameter portion 28c of the drive shaft 28 and a central hole 94a defined in the mass portion 94.

The operation of the compressor will now be described.

When the compressor is not operating, the pressure in the compression chambers 40 is substantially equal to the pressure in the crank chamber 41. The inclination of the wobble plate 69 is thus minimum as shown in FIG. 7. The minimum inclination of the wobble plate 69 is greater than zero degrees. In this state, the valve body 86 of the control valve 80 contacts the valve seat 83 to close the through hole 85. When the clutch 31 connects the shaft 28 with the pulley 33, the driving force of the engine E is transmitted to the drive shaft 28 through the belt 32 and the clutch 31. This causes the rotor 63, coupling pin 67 and the rotary journal 68 to integrally rotate. Rotation of the journal 68 allows the wobble plate 69 to oscillate without rotating. The oscillation of the wobble plate 69 reciprocates the pistons 62. The reciprocation of the pistons 62 draws refrigerant gas from the suction chamber 46 into the compression chamber 40. The gas is then compressed to a certain pressure level and is discharged to the discharge chamber 48.

If the cooling load is great, the pressure of the gas evaporated in the evaporator in the external refrigerant circuit is high. Also, the suction pressure in the suction chamber 46 is relatively high. The high suction pressure acts on the pressure sensing chamber 90. The diaphragm 89 is displaced rearward by the difference between the pressure in the chamber 90 and the pressure in the constant pressure chamber 92. This moves the rod 88 rearward and separates the rod 88 from the valve body 86. The valve body 86 is thus pressed against the valve seat 83 by the spring 87. This closes the through hole 85. Accordingly, the flow of highly pressurized gas from the discharge chamber 48 to the crank chamber 41 is stopped. The refrigerant gas in the crank chamber 41 flows into the suction chamber 46 through the space between the drive shaft 28 and the radial bearing 29 and the space 58 between the mass portion 94 of the damper 93 and the valve plate 24.

The relatively high suction pressure in the suction chamber 46 acts on the head of each piston 62 thereby increasing the stroke of the piston 62. At this time, the rotary journal 68 receives an angular moment in a direction increasing the inclination of the wobble plate 69 through the piston rods 70 and the wobble plate 69. The angular moment moves the slider 71 forward against the force of the spring 73 thereby increasing the inclination of the wobble plate 69 as shown in FIG. 6. Accordingly, the compressor operates at a large displacement. As long as the high suction pressure is acting on the pressure sensing chamber 90, the wobble plate 69 is retained at the maximum inclination.

Contrarily, if the cooling load lowers, the pressure of the vaporized gas in the evaporator is lowered. Accordingly, the suction pressure in the suction chamber 46 is lowered. This lowers the pressure in the pressure sensing chamber 90. The diaphragm 89 is displaced forward by the difference between the pressure in the chamber 90 and the pressure in the constant pressure chamber 92. The diaphragm 89 moves the valve body 86 by the rod 88 thereby opening the through hole 85. This allows the highly pressurized gas in the discharge chamber 48 to flow in the crank chamber 41 via the passage 81 and the through hole 85. The pressure in the crank chamber 41 is therefore higher than the suction pressure. The stroke of each piston 62 is decreased by the difference between the pressure in the crank chamber 41 and the suction pressure. At this time, the rotary journal 68 receives angular moment in a direction decreasing the inclination of the wobble plate 69. The angular moment moves the slider 71 rearward in cooperation with the force of the spring 73. Accordingly, the inclination of the wobble plate 69 is decreased as shown in FIG. 7. This decreases the displacement of the compressor. In this manner, the refrigerant capacity of the compressor is lowered in accordance with the decrease in the cooling load.

As in the first embodiment, the damper 93, which is fixed to the rear end of the drive shaft 18, reduces torque fluctuation of the drive shaft 28 and rotational speed fluctuation of the pulley 33. Accordingly, the noise in the passenger compartment is reduced. Further, the second embodiment has the following advantages.

The impeller-like mass portion 94 is located in the refrigerant gas filling the suction chamber 46. Therefore, when the mass portion 94 is rotated, the gas applies resistance to the projections 95. This reduces the vibration of the mass portion 94 thereby reducing the torsional vibration of the drive shaft 28. As a result, torque fluctuation of the drive shaft 28 and rotational speed fluctuation of the pulley 33 are further reduced.

The mass portion 94 is fixed to the drive shaft 28 with the elastic portion 96 in between. Therefore, torsional vibration of the drive shaft 28 causes the damper 93 to resonate. This effectively reduces rotational vibration of the mass portion 94.

Figure 9:
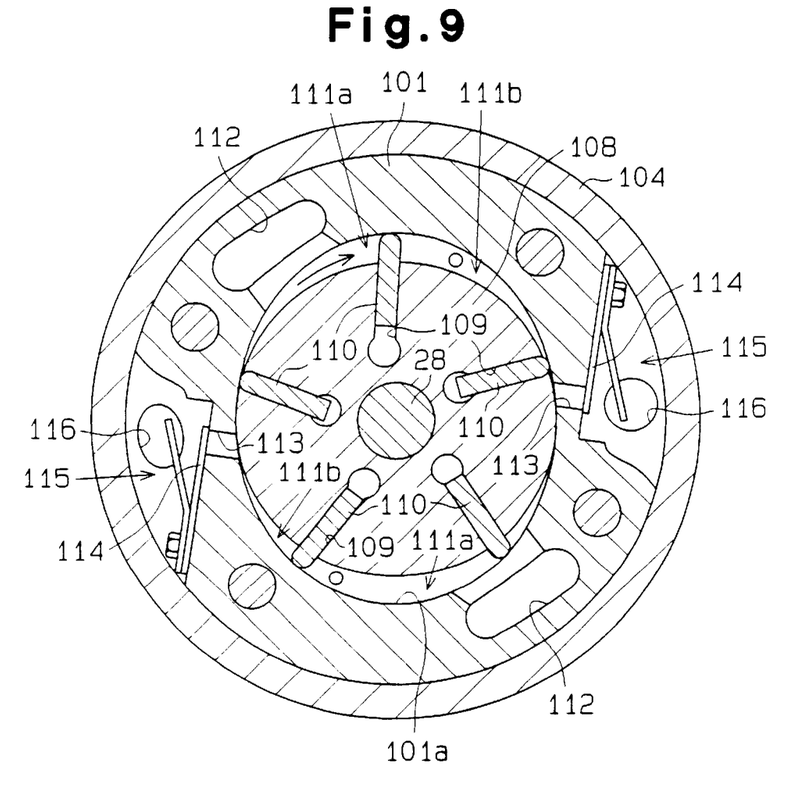
FIG. 9 is a partial cross-sectional view taken along line 9—9 in FIG. 10.
Figure 10:
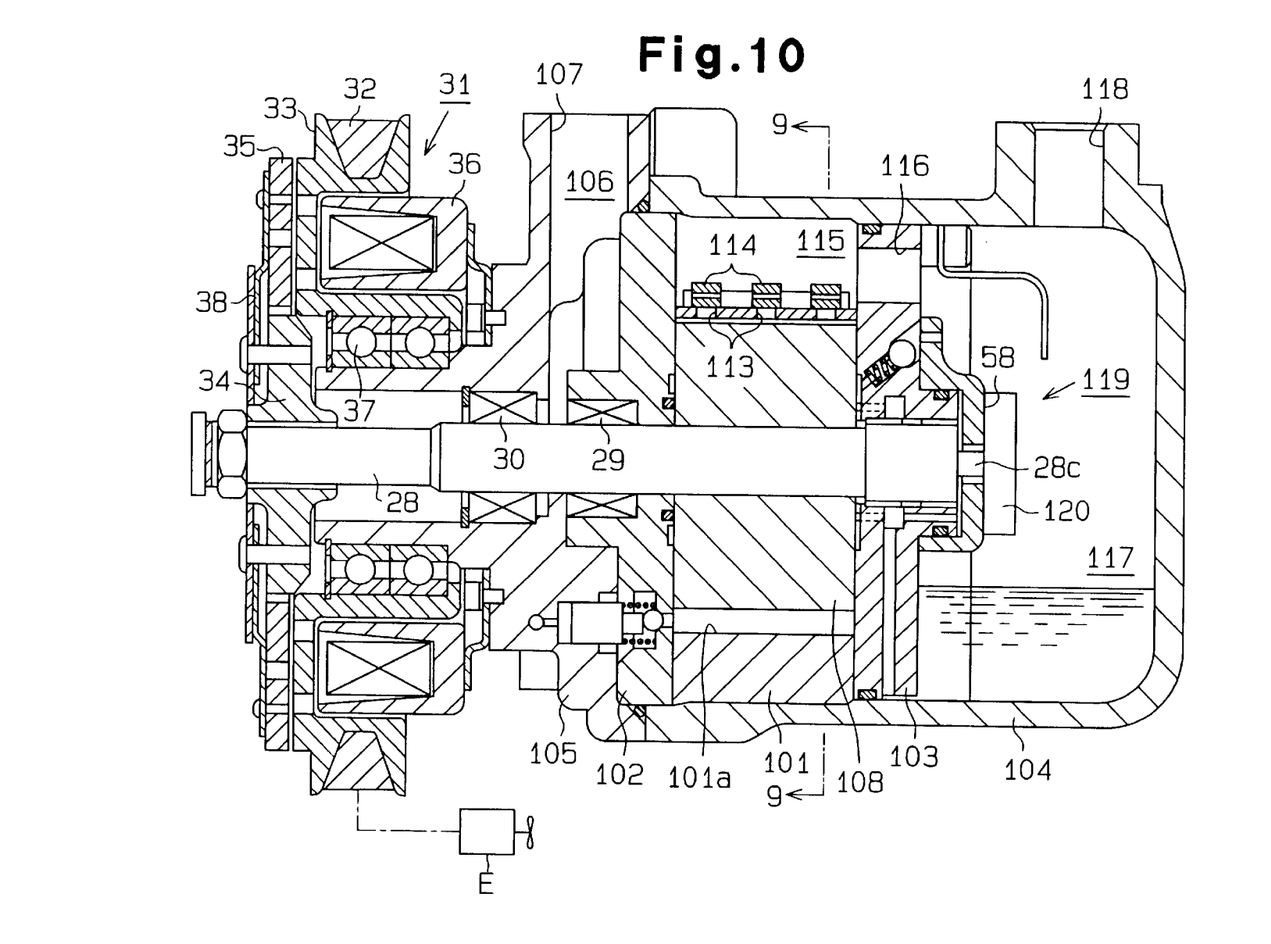
FIG. 10 is a partial cross-sectional view showing a compressor according to a third embodiment of the present invention.

A third embodiment of the present invention will now be described with reference to FIGS. 9 and 10. FIGS. 9 and 10 show a vane type variable displacement compressor.

As shown in FIG. 10, a front housing 105 and a rear housing 104 are secured to each other. A front side plate 102, a rear side plate 103 and a cylinder block 101 are accommodated in the housings 104 and 105. The rear side plate 103 constitutes a compressor housing.

The front side plate 102 and the front housing 105 define a suction chamber 106. Refrigerant gas is drawn into the suction chamber 106 through an inlet port 107. A drive shaft 28 is supported by the side plates 102, 103. A radial bearing 29 is located between the shaft 28 and the front side plate 102. The drive shaft 28 is rotated by the force of the engine E, which is transmitted by a clutch 31 and the belt 32.

As shown in FIG. 9, a cylinder bore 101a, which has an elliptical cross section, is defined in the cylinder block 101. A rotor 108 is secured to the drive shaft 28 and is housed in the cylinder bore 101a. A plurality of radial vane slots 109 are defined in the rotor 108. A vane 110 is slidably fitted in each vane slot 109. Each vane 110 can be completely retracted in the vane slot 109 and protruded from the slot 109. A pair of sickle-shaped spaces are defined by the cylinder block 101 and the rotor 108. Each sickle-shaped space is divided into compression chambers 111a and 111b. Each compression chamber 111a, 111b alternately performs suction and compression of gas. A pair of suction passages 112 are defined in the front side plate 102. Each suction passage 112 communicates the suction chamber 106 with a compression chamber 111a when the chamber 111a is in the suction process.

A pair of discharge chambers 115 are defined in the peripheral portion of the cylinder block 101. Each discharge chamber 115 is communicated with one of the compression chambers 111b that is in the compression process. As shown in FIG. 10, discharge passages 116 are defined in the rear side plate 103. The passages 116 communicate the discharge chambers 115 with an oil separation chamber 117, which is defined in the rear housing 104. The oil separation chamber 117 is connected to the external refrigerant circuit via an outlet port 118 formed in the rear housing.

When the shaft 28 is rotated, the rotor 108 rotates integrally with the shaft 28. This draws the refrigerant gas from the suction chamber 106 into compression chambers 111a that are in the suction process. The gas in the compression chambers 111b that are in the compression process is compressed to a certain pressure and is discharged to the discharge chambers 115 via the discharge ports 113. The gas is then drawn into the oil separation chamber 117, in which oil is separated from the gas. Finally, the gas is discharged to the external refrigerant circuit via the outlet port 118.

The drive shaft 28 has a small diameter portion 28c at its rear end. A disk-shaped mass portion 120 of a dynamic damper 119 is secured to the small diameter portion 28c by bolts (not shown). The small diameter portion 28c, which is integrally formed with the drive shaft 28, functions as an elastic portion of the dynamic damper 119.

In addition to the advantages as the first embodiment, the third embodiment has the following advantages.

The small diameter portion 28c of the drive shaft 28 functions as the elastic portion of the dynamic damper 119. That is, the small diameter portion 28c functions as a metal torsion spring. Therefore, the elastic modulus of the elastic portion is constant regardless of the temperature about the damper 119. The resonance frequency of the dynamic damper 119 is therefore stabilized. Thus, the mass portion 120 is oscillated at a desired resonance frequency, which is set in accordance with the torsional vibration of the drive shaft 28. This positively reduces torque fluctuation of the drive shaft 28 and rotational speed fluctuation of the pulley 33.

The elastic portion of the dynamic damper 119 is formed integrally with the drive shaft 28. Therefore, the elastic portion is easily formed when manufacturing the drive shaft 28.

Although three embodiments of the present invention have been described herein, it should be apparent to those skilled in the art that the present invention may be embodied in many other specific forms without departing from the spirit or scope of the invention. Particularly, it should be understood that the invention may be embodied in the following forms.

Figure 11:
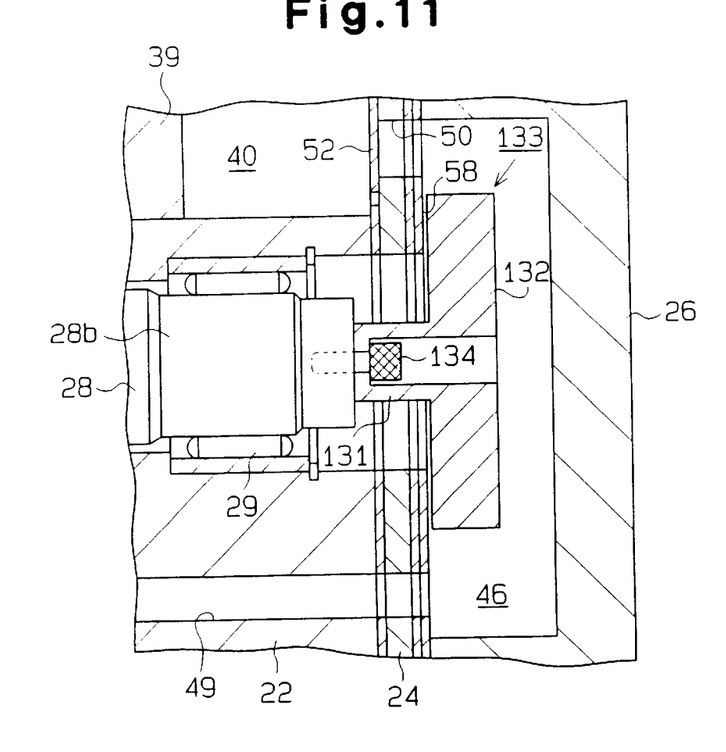
FIG. 11 is an enlarged partial cross-sectional view showing a dynamic damper of fourth embodiment.

The dynamic dampers 55, 93, 119 may be replaced with a dynamic damper 133 illustrated in FIG. 11. The damper 133 includes a hollow cylindrical elastic body 131 and a mass portion 132 that extends radially from the opening of the elastic body 131. The damper 133 is connected to the rear end of the drive shaft 28 by a bolt 134. This structure has the same effect and advantages as the first embodiment. The elastic portion 131 and the mass portion 132 are integrally formed. This reduces the number of parts of the compressor.

Figure 12:
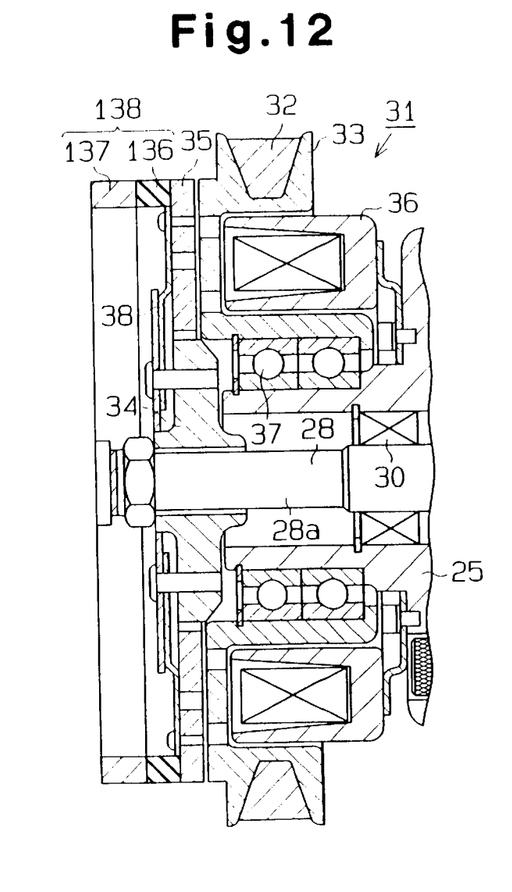
FIG. 12 is an enlarged partial cross-sectional view showing a dynamic damper of fifth embodiment.
Figure 13:
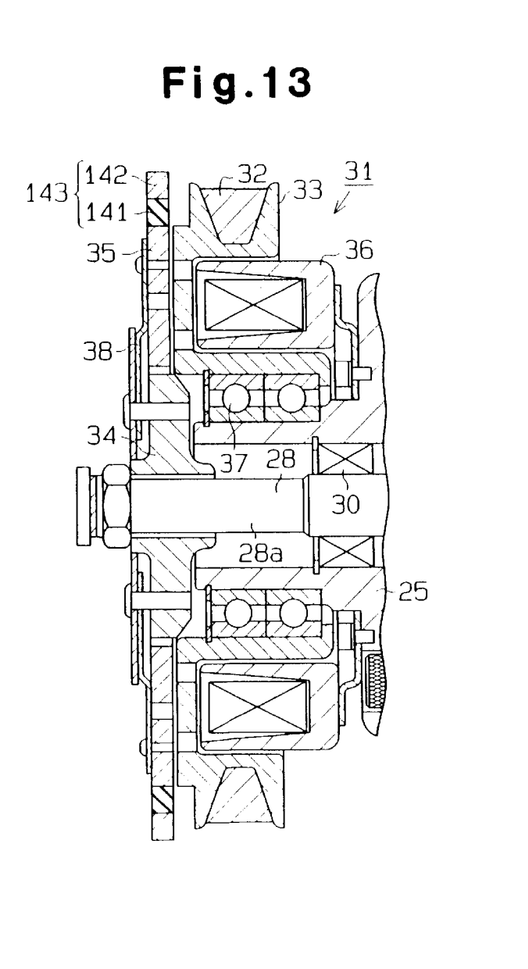
FIG. 13 is an enlarged partial cross-sectional view showing a dynamic damper of sixth embodiment.

The dynamic dampers 55, 93, 119 may be omitted and a dynamic damper 138 shown in FIG. 12 may be provided at the front end of the armature 35, instead. The damper 138 includes an annular rubber elastic portion 136 and an annular metal mass portion 137. Further, a dynamic damper 143 shown in FIG. 13 may be provided about the circumference of the armature 35. The dynamic damper 143 includes an annular rubber elastic portion 141 and an annular metal mass portion 142.

A narrow space, in which oil film is formed, may be defined between the rear face of the mass portions 57, 94, 120 of the dynamic dampers 55, 93, 119 and the inner wall of the rear housings 26, 104 facing the mass portions 57, 94, 120. This structure reduces the vibration of the mass portions 57, 94, 120.

The present invention may be employed in other types of compressors, for example, a wave plate type compressor having double-headed pistons, a swash plate type compressor having single-headed pistons, a wobble plate type fixed displacement compressor having single-headed pistons, and a scroll type compressor.

Therefore, the present examples and embodiments are to be considered as illustrative and not restrictive and the invention is not to be limited to the details given herein, but may be modified within the scope and equivalence of the appended claims.

What is claimed is:

1. A compressor comprising:
    a housing;
    a plurality of compression chambers defined in the housing;
    a drive shaft rotatably supported by the housing, the drive shaft being driven by a power source, the drive shaft having a first end and a second end;
    a rotor integrally rotatable with the drive shaft;
    a clutch for selectively connecting and disconnecting the power source with the drive shaft, wherein the clutch is supported by the second end of the drive shaft;
    a transmission mechanism for transmitting power from the power source to the drive shaft, wherein the transmission mechanism includes a pulley rotatably supported on the drive shaft and a connecting means for connecting the power source to the pulley;
    a compression means for compressing gas supplied to the compression chambers based on the rotation of the rotor; and
    a dynamic damper connected to the first end of the drive shaft for reducing the vibration of the drive shaft, the dynamic damper including an elastic member having a predetermined elasticity and a mass member having a predetermined mass;
    wherein the transmission mechanism and said rotor form a mass body, and wherein the elastic member is located between the mass body and the mass member.

2. A compressor according to claim 1, wherein said clutch includes:
    an inner hub fixed to the second end of the drive shaft, the inner hub having a disc-like shape;
    an armature fixed to the inner hub, wherein the armature is capable of coupling with the pulley, said armature being constructed and arranged to be movable to a first position for connecting the drive shaft to the pulley for integral rotation therewith and to a second position for disconnecting the drive shaft to the pulley;
    an actuating means for moving the armature to the first position; and
    an urging means for urging the armature to the second position.

3. The compressor according to claim 2, wherein said actuating means includes a solenoid for connecting the armature to the pulley.

4. The compressor according to claim 1, wherein said elastic member of the dynamic damper is connected to the first end of the drive shaft, and wherein said drive shaft has a predetermined elasticity.

5. The compressor according to claim 1, wherein the housing has a suction chamber for containing gas to be supplied to the compression chamber, and wherein the mass member of the dynamic damper is positioned in the suction chamber.

6. The compressor according to claim 1, wherein said mass member has a portion that is closely adjacent to the housing, and wherein an oil film is formed between the mass member and the housing.

7. The compressor according to claim 1, wherein said mass member has a disc-like shape.

8. The compressor according to claim 1, wherein said mass member has a plurality of radially projecting elements.

9. The compressor according to claim 1, wherein said elastic member is made of rubber.

10. The compressor according to claim 1, wherein the diameter of the elastic member is smaller than that of the drive shaft.

11. The compressor according to claim 1, wherein said elastic member is made of metal.

12. The compressor according to claim 11, wherein said elastic member is formed integrally with the drive shaft.

13. The compressor according to claim 11, wherein said elastic member is formed integrally with said mass member.

14. The compressor according to claim 1, wherein said compression means includes a plurality of pistons.

15. The compressor according to claim 14, wherein said rotor includes a rotating plate that integrally rotates with the drive shaft, and wherein said pistons are connected to the rotating plate and are reciprocated by the rotation of the rotating plate.

16. The compressor according to claim 14, wherein said rotor includes a drive plate fixed to the drive shaft, and wherein said compression means includes a driven plate tiltably supported by the drive shaft, and wherein the driven plate slidably contacts with the drive plate, and wherein the driven plate is connected to the pistons such that the pistons are reciprocated with the rotation of the drive plate.

17. The compressor according to claim 1, wherein said rotor is fixed to the drive shaft and has a plurality of radially extending vanes, and wherein the housing, the rotor and the vanes define the compression chambers.

18. The compressor according to claim 1, wherein said elastic member and said mass member are located at axially different positions with respect to the drive shaft.

19. The compressor according to claim 1, wherein said elastic member and said mass member are located at radially different positions with respect to the drive shaft.

20. A compressor comprising:
a housing;
a plurality of compression chambers defined in the housing;
a drive shaft rotatably supported by the housing, the drive shaft being driven by a power source, the drive shaft having a first end and a second end;
a rotor integrally rotatable with the drive shaft;
a clutch for selectively connecting and disconnecting the power source with the drive shaft, wherein the clutch is supported by the second end of the drive shaft;
a transmission mechanism for transmitting power from the power source to the drive shaft, wherein the transmission mechanism includes a pulley rotatably supported on the drive shaft and a connecting means for connecting the power source to the pulley;
a compression means for compressing gas supplied to the compression chambers based on the rotation of the rotor; and
a dynamic damper disposed proximate the second end of the drive shaft for reducing the vibration of the drive shaft, the dynamic damper including an elastic member having a predetermined elasticity and a mass member having a predetermined mass;
wherein the transmission mechanism and said rotor form a mass body, and wherein said elastic member and said mass member are located about a circumference of an armature of said clutch.

21. The compressor according to 20, wherein said clutch includes:
an inner hub fixed to the second end of the drive shaft, the inner hub having a disc-like shape;
an armature fixed to the inner hub, wherein the armature is capable of coupling with the pulley, said armature being constructed and arranged to be movable to a first position for connecting the drive shaft to the pulley for integral rotation therewith and to a second position for disconnecting the drive shaft to the pulley;
an actuating means for moving the armature to the first position; and
an urging means for urging the armature to the second position.

22. The compressor according to 21, wherein said elastic member of the dynamic damper is connected to the armature.

23. The compressor according to claim 22, wherein said dynamic damper is fixed to one side of the armature, and wherein said elastic member and said mass member are located at axially different positions with respect to the drive shaft.

24. The compressor according to claim 21, wherein said dynamic damper is fixed to the outer surface of the armature, and wherein said elastic member and said mass member are located at different radial positions with respect to the drive shaft.

25. The compressor according to claim 24, wherein said elastic member and the mass member have a ring shape.

26. The compressor according to claim 20, wherein said elastic member is made of metal.

27. The compressor according to claim 26, wherein said elastic member is formed integrally the drive shaft.

28. The compressor according to claim 26, wherein said elastic member is formed integrally with said mass member.

29. A compressor comprising:
a housing;
a plurality of compression chambers defined in the housing;
a drive shaft rotatably supported by the housing, the drive shaft being driven by a power source, the drive shaft having a first end and a second end;
a rotor integrally rotatable with the drive shaft;
a transmission mechanism for transmitting power from the power source to the drive shaft, the transmission mechanism including a pulley rotatably supported on the drive shaft and a belt for connecting the power source to the pulley;
an electromagnetic clutch for selectively connecting and disconnecting the power from the power source with the drive shaft, wherein the clutch is supported by the second end of the drive shaft, and wherein the clutch further includes a clutch plate fixed to the second end of the drive shaft for transmitting power from the pulley to the drive shaft and an electromagnetic solenoid for selectively connecting and disconnecting the clutch plate to the pulley;
a compression means for compressing gas supplied to the compression chambers based on the rotation of the rotor; and
a dynamic damper connected to the first end of the drive shaft for reducing the vibration of the drive shaft, the dynamic damper including an elastic member having a predetermined elasticity and a mass member having a predetermined mass;
wherein the transmission means, and said rotor form a mass body, and wherein the elastic member is located between the mass body and the mass member.

30. A mechanism for reducing vibration of a drive shaft of a compressor, wherein the compressor includes:
a housing;
a drive shaft rotatably supported by the housing, the drive shaft being driven by a power source, the drive shaft having a first end and a second end;
a rotor integrally rotatable with the drive shaft, wherein the rotor works to compress gas;
a clutch for selectively connecting and disconnecting the power source with the drive shaft, wherein the clutch is supported at one end of the drive shaft;
a transmission mechanism for transmitting power from the power source to the drive shaft, wherein the transmission mechanism includes a pulley rotatably supported on the drive shaft and a connecting means for connecting the power source to the pulley;
wherein the mechanism for reducing vibration comprises:
a dynamic damper connected to the first end of the drive shaft for reducing the vibration of the drive shaft, the dynamic damper including an elastic member having a predetermined elasticity and a mass member having a predetermined mass; and
wherein the transmission mechanism, and said rotor form a mass body, and wherein the elastic member is located between the mass body and the mass member.

31. A compressor comprising:
a housing;
a plurality of compression chambers defined in the housing;
a drive shaft drivable by a power source rotatably supported by the housing;

a rotor mounted such that it rotates integrally with the drive shaft to actuate a compression means for compressing gas supplied to the compression chambers;

a clutch for selectively connecting and disconnecting the power source with the drive shaft, wherein the clutch is supported at an end portion of the drive shaft;

a belt transmission transmitting the driving power from the power source to the drive shaft, a pulley of the belt transmission being coupled through the clutch to the drive shaft;

a first spring damper mass system formed by the belt transmission;

a second spring damper mass system formed by the clutch;

a third spring damper mass system formed by the drive shaft having the rotor mounted thereon; and a fourth spring damper mass system comprising an elastic member having a predetermined elasticity and a mass member having a predetermined mass such that vibrations of the drive shaft is reduced, said forth spring damper mass system is connected to a first end of said drive shaft;

wherein said systems are arranged serially.

32. A compressor comprising:

a housing;

a plurality of compression chambers defined in the housing;

a drive shaft rotatably supported by the housing, the drive shaft being driven by a power source, the drive shaft having a first end and a second end;

a rotor integrally rotatable with the drive shaft;

a clutch for selectively connecting and disconnecting the power source with the drive shaft, wherein the clutch is supported by the second end of the drive shaft;

a transmission mechanism for transmitting power from the power source to the drive shaft, wherein the transmission mechanism includes a pulley rotatably supported on the drive shaft and a connecting means for connecting the power source to the pulley;

a compression means for compressing gas supplied to the compression chambers based on the rotation of the rotor; and a dynamic damper for reducing the vibration of the drive shaft, the dynamic damper including a metal elastic member having a predetermined elasticity and a mass member having a predetermined mass;

wherein the transmission mechanism and said rotor form a mass body, and wherein the metal elastic member is located between the mass body and the mass member.

* * * * *